United States Patent [19]

Flanders

[11] 4,050,340
[45] Sept. 27, 1977

[54] POWER TOOL TRACK
[76] Inventor: Robert D. Flanders, 28035 SW. Parkway, Wilsonville, Oreg. 97070
[21] Appl. No.: 599,123
[22] Filed: July 25, 1975

Related U.S. Application Data

[62] Division of Ser. No. 454,980, March 26, 1974, Pat. No. 3,983,776.

[51] Int. Cl.² .............................................. B27B 9/04
[52] U.S. Cl. ..................................... 83/743; 83/522; 83/581
[58] Field of Search ................ 83/743, 745, 455, 581, 83/522

[56] References Cited

U.S. PATENT DOCUMENTS

| 2,708,465 | 5/1955 | Huebner et al. | 83/745 |
| 2,773,523 | 12/1956 | Hopla | 83/745 |
| 3,186,452 | 6/1965 | Magnussen | 83/745 |
| 3,741,063 | 6/1973 | Bretthauer | 83/745 |
| 3,830,130 | 8/1974 | Moore | 83/745 |

Primary Examiner—Frank T. Yost

[57] ABSTRACT

A power tool track for adapting an existing power tool, such as an electric circular saw, so that it can effectively make accurate straight or angular cuts in wood.

10 Claims, 3 Drawing Figures

POWER TOOL TRACK

This is a division of application Ser. No. 454,980, filed Mar. 26, 1974, now U.S. Pat. No. 3,983,776.

BACKGROUND OF THE INVENTION

Anyone who does any carpentry or construction work, either industrial, commercial, or in a home workshop, owns an electric circular saw. If precision cabinetry or furniture work is contemplated, the additional purchase of a table saw or a radial arm saw may become necessary. However, the radial arm and table saws may cost up to about ten times as much as a comparable circular saw. An electric saw of the hand-held type is capable of making many types of cuts in many kinds of materials. But, there are no commercially available devices which can be used to guide the saw so that the accurate cuts required by nearly every type of wood fabricating procedure can be made easily. The user does find that the saw is extremely useful in making long diagonal cuts in plywood and particle board but, again, the same problem of making straight accurate cuts is present.

Therefore, resort to the selection and purchase of the above described table and radial arm saws is inevitable. Purchase of these items is justified by envisioning the realization of a large savings by the construction of costly furniture and cabinet items. However, in using this new equipment, there are many limitations to overcome. First, both units require a large area of floor space in use. This space is required around each unit to allow for "in-feed" and "out-feed" of large pieces of lumber or plywood. Lumber for most projects requires 8 to 12 foot lengths and plywood and particle sheets 4 feet by 8 feet in dimension must be ripped and cross-cut. This work can be done only if at least something over 12 feet of clear space for in-feed and out-feed, and at lest 4 or 5 feet in front of each unit, is provided.

Second, the expensive table and radial saws cannot be left outdoors, even overnight, because dew or moisture causes them to rust in a matter of a few hours. Moreover, since these saws are heavy and unwieldy, they cannot be readily moved from an indoor to an outdoor location. This forces owners to commit valuable permanent floor space in a shop, garage, or other area, to this equipment. In most instances, by the time this equipment has been installed in most normal workshop areas, little room is left to house other tyes of equipment. Commercial users of the above saws find the same problems even more magnified because of the use of longer, wider dimension lumber or plywood. They find even greater difficulty attached to the transport of equipment from job site to shop.

In addition to the aforementioned problems, the owner of the table saw finds that his saw cannot cut a straight line in a longitudinally-warped board or in a diagonal line in a piece of plywood or board. In addition, to handle a large piece of plywood through the saw is a very difficult procedure due to its weight, size, and the constant tendency to veer away from the guiding fence. This tends to produce crooked edges. In short, one finds that the high priced table saw has considerable limitations due to its size and the amount of space it occupies, as well as the general cutting and accuracy limitations.

The owner of the radial arm saw finds that the machine is even more limited in scope than the table saw. More specifically, its primary effectiveness is in making straight cross-cuts in dimensional lumber of less than 12 inches wide and two inches thick. If the board or piece of material is over 12 to 14 inches wide, it cannot make angles because the saw itself does not travel far enough along on the support arm. The saw is further limited in cabinet work because most of the work is done with plywood or particle board. The normal sizes of this material are too large to permit the use of a radial arm saw. Although the employment of a radial arm saw, or a router, is possible, it is not practical due to the adaptors and fittings which must be bought and the extensive time required to set up the equipment for each individual run.

A continuous problem is the copious quantities of sawdust generated in closed quarters. In places such as a shop, garage, or workshop, where table and radial arm saws must be kept in home use, sawdust flies all over the room every time the machine is operated. It also penetrates every cabinet and shelf and sifts into every open space or storage area in the room. Where saws are in shops attached to the living quarters, the sawdust even gets into the house by being tracked in, or moved by air currents which blow the dust into the house every time the door opens. Normally, floors in the entire area must be cleaned after each use of the equipment. Sawdust collection and removal are both expensive to install and tends to add greatly to the fire hazards in the shop and adjacent structures.

SUMMARY OF THE INVENTION

The subject power tool track provides a means for adopting a power tool, such as an electric circular saw, or other existing portable equipment, for use in overcoming the problems associated with, and previously described as existing in the prior art. More specifically, the portable tool track of the present invention provides a means for guiding a tool, such as the above described circular saw or router in a predetermined path and in a straight line for making straight line or angular cuts. As a saw tack, the subject device is provided with a guiding edge against which the portable tool rides as it is moved in making straight line precision cuts. For example, any standard saw of almost any vintage may, therefore, be used with the subject tool track. In a second feature, the tool track of this invention is provided with an adjustable support surface for receiving a plurality of tools of different sizes.

In a second embodiment, the subject tool track is pivotally mounted on a supporting substructure for use, for instance, in making cuts in the wood at varying angles. This tool track system includes all of the aforementioned features and, in addition, is mounted for vertical adjustment for receiving a multitude of work pieces having a plurality of thicknesses.

The novel constructional features of the subject invention provide it with a number of important advantages. First, considerable cost savings are provided by the ability of the attachment of the present invention to be adaptable with existing equipment, i.e., permitting it to be used with a standard tool, such as the circular saw or router, the savings being quite pronounced especially on a commercial basis. Second, the subject device provides a means for allowing straight or angular accurate cuts to be made in plywood, particle board, or other like materials. This includes long, diagonal cuts, straight cuts in warped board and long miter-type cuts outside the capabilities of the radial arm saw, as well as the ease of use of a router, or other like device, for innumerable home or commercial projects. Additional savings are provided in that the user does not have to provide permanent work space for the saw track device. In fact, ease of storage, out of the reach of small children or others who could readily be injured by, for example, a saw blade, is a key safety feature. The subject device is usable in the minimum of work space since the work piece, itself, is employed as the work table. Another important feature present herein, which is not present with the known table and radial arm saws, is the ease of movement of the subject equipment. All that is needed to perform a given job is the light-weight portable saw track or miter saw track, a pair of wooden horses and the portable tool to be employed. This is particularly critical in commercial operations where movement of equipment from job to job is a critical cost factor. In this line, by using the device of this invention, in pre-setting the table of the portable track to conform to a given tool, minimum setup times only are required for the use of this equipment. Finally, when the subject system is set up outdoors, the sawdust problem associated with indoor use in a shop or work room adjoining one's house is eleviated.

It is, therefore, a principal objective of the present invention to provide a novel portable tool track which combines versatility and low cost by providing a means for permitting standard work tools, such as a circular saw or router, to be effectively and efficiently used in place of expensive equipment having the previously described disadvantages, such as a radial arm or table saw.

It is a further object of the present invention to provide the above described device which is capable of accurately making straight or angular cuts, long diagonal cuts, or straight cuts in a warped board, such as in a large sheet of plywood.

It is a further object of the present invention to provide a device which is capable of working in a small space, is easily moved from place to place, is readily storable, out of the reach of children, performs well in a minimum work area, and requires a minimal set-up time, as well as a means for avoiding indoor sawdust problems.

Finally, it is a further object of the present invention to provide the above objects in a device which can be used both in the home or commercially.

The foregoing and other objectives, advantages and features of the present invention will be more readily understood by consideration of the following detailed description of the present invention taken in conjunction with the accompanying drawings.

DETAILED DESCRIPTION OF THE INVENTION

Figure 1:
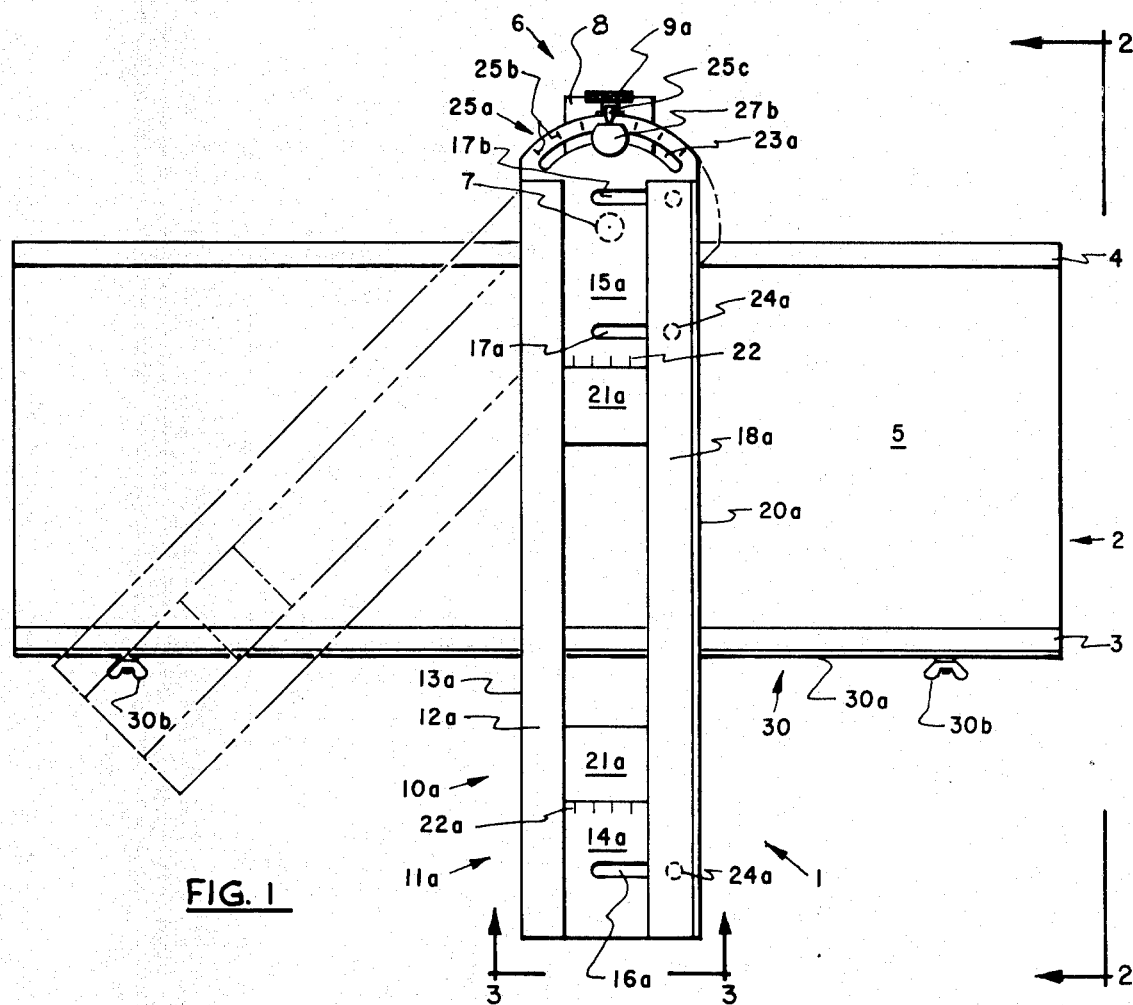
FIG. 1 is a plan view of the power tool track system of the present invention with the tool track in a laterally-extending and right angle (in phantom) positions.
Figure 3:
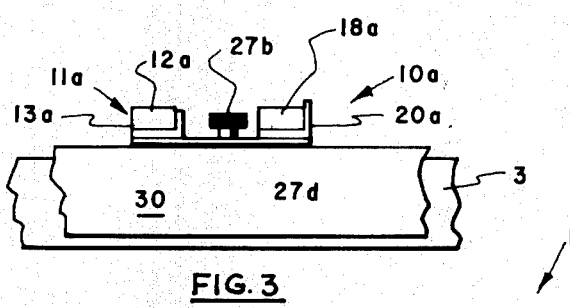
FIG. 3 is a front elevation view of the track system of FIG. 1, the tool track being locked in position and buttressed at its free end.
Figure 2:
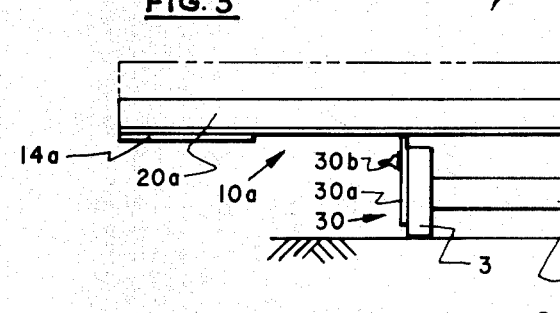
FIG. 2 is an end elevation view of the tool track system shown in FIG. 1.

As shown in FIGS. 1-3, a power tool track system, generally designated as "1", comprises a support substructure 2, which includes a pair of longitudinally-extending side panels 3 and 4 attached to a longitudinally-extending floor member 5. Support means 6, connected to support substructure 1, for supporting the hereinafter described power tool track in a substantial horizontal plane with respect to the vertical axis of substructure 2, which preferably includes a vertically-extending cylindrical shaft 7 supported on the inner portion of laterally-extending plate 8. A second vertically-extending upright member 9, which includes means 9a for providing vertical adjustment in a vertical plane with respect to the vertical axis of upright member 9, is mounted on the outer portion of plate 8. A power tool track 10a, of similar construction to power tool track 10, is adjustably mounted on support means 6 for angular movement in a horizontal plane with respect to the vertical axis of substructure 2. Power tool track 10a is comprised of a longitudinally-extending base member 11a which preferably includes a longitudinally-extending frame member 12a, having an outer edge 13a, attached to a laterally-extending bracing member 14a and bracing plate 15a containing laterally-extending slots 16a, 17a and 17b. Slot 16a is contained in bracing member 14a, while slots 17a and 17b are contained in bracing plate 15a. A second, adjustable, longitudinally-extending frame member 18a rides within slots 16a, 17a and 17b, and has a longitudinally-extending guide means 20a attached thereto for maintaining a power tool in proper alignment for traversing a straight, predetermined, longitudinal path. Guide means 20a is raised above the upper surface of frame member 18a to form a support surface for a plurality of power tools as described above. Alignment means 21, locating means 22 and locking means 24 of previously described power tool track 10 have similar counterparts in tool track 10a, namely, alignment, locating, and locking means 21a, 22a, and 24a, respectively. In addition, a curved slot 23a is provided having a second alignment means 25a associated therewith for indicating the angular position of track 10a with respect to the vertical axis of support means 6. This second alignment means includes numeral indicia 25b on bracing plate 15a and a pointer 25c to indicate the angular location of track 10a. Means for locking the power track in proper angular position 27a, as indicated by pointer 25c, are provided in this case by a foreshortened circular knob 27b having a threaded stud 27c connected to a circular boss 27d of knob 27b which matingly engages threaded opening 9a in upright member 9. Prop means 30, adjustably mounted to substructure 2 for movement in a vertical plane with regard to the horizontal axis of the substructure, serves to buttress the free end of tool track 10a in a proper, horizontal plane with respect to the vertical axis of the substructure. More specifically, plate 30a is mounted to substructure 2 by adjustable fastening means 30b, such as screws and the like, for adjustable, vertical movement as previously described. After plate 30a engages tool track 10a, adjustable fastening means 30b are secured tightly in position to provide a rigid buttressing structure.

In use, for example, a work piece 26, is secured in position on substructure 2 so that its longitudinal axis is perpendicular to the longitudinal axis of tool track 10a when positioned so that the angular reading registered on second alignment means 25a reads "zero", by clamp 28, or other similar means. Saw track 10a is then moved so that its lower surface contacts work piece 26. This is accomplished by disengaging vertical adjustment means 9a. Once the work piece is contacted by saw track 10a, the vertical adjustment means is locked in position. The proper angular location of track 10a is then preset by angularly moving the track about support means 60 until the desired reading is maintained on alignment means 25a. Angular positioning means 27a is then locked in place and the tool track prepared for receiving the required power tool as described previously with respect to power tool track 10. If a standard miter cut in wood, for example, is to be made, the track is set at a 45° angle (see phantom FIG. 1).

After the above process is completed, the above steps are performed in reverse order and the properly tooled work piece recovered.

Th foregoing terms and expressions which have been employed in the abstract and specification are used therein as terms of description and not of limitation, and there is no intention, in the use of such terms and expressions, of excluding equivalents of the features shown and describe the portions thereof, it being recognized that the scope of the invention is defined and limited only by the claims which follow.

What I claim is:

1. A power tool track system comprising a support substructure, means connected to said substructure for supporting a power tool above said substructure in a substantially horizontal plane with respect to the vertical axis of said substructure, said power tool track being adjustably mounted on said support means for angular movement in a horizontal plane with respect to the vertical axis of said substructure, and including longitudinally-extending base and adjustable frame members, respectively, which provide a support surface for carrying power tools thereon, the frame member having an outer edge forming a longitudinally-extending straight edge for maintaining the accuracy in use of said power tools and, attached to the frame member, a longitudinally-extending guide means, raised above the surface of said frame member, for maintaining a power tool in proper alignment for traversing a straight predetermined, longitudinal path, the distance from the guide means to the outer edge of said base member, the predetermined support surface on which said power tool will ride, being such that said power tool will be in close proximity with, and more parallel to, said outer edge, and said frame member being laterally adjustable for providing a laterally-extending support surface capable of carrying a plurality of power tools.

2. The power tool track of claim 1 including means for lockingly maintaining said frame member in position, thereby providing a laterally-extending support surface of predetermined dimension capable of properly carrying a given power tool.

3. The power tool track of claim 1 which further includes means for maintaining said guide means in proper alignment with respect to the longitudinal axis of said base member are attached to the bottom of said frame member for reinforcing and maintaining the ability of said guide means to effectively act as a straight edge, as the frame moves laterally within said slots.

4. The power tool track system of claim 3, wherein one of said bracing members includes numerical indicia for maintaining said guide means in proper position with respect to said frame member, thereby providing a proper support for accurately guiding a given power tool.

5. The power tool track system of claim 3, wherein said base member is buttressed at its free end by prop means, attached to said substructure, and adjustable in a vertical plane with respect to the horizontal axis of said substructure.

6. The power tool track system of claim 3, wherein said base member is attached to said support means and mounted for vertical adjustment for receiving a multitude of work pieces having a plurality of thicknesses.

7. The power tool track system of claim 1 further including means for locating the proper predetermined position of said guide means, thereby quickly and accurately establishing the laterally-extending dimension of said support surface.

8. A power tool track comprising:
   a. a longitudinally-extending substructure;
   b. support means attached to said substructure;
   c. longitudinally-extending base and adjustable frame members, respectively, adjustably mounted on said support means for angular movement in a substantially horizontal plane with respect to the vertical axis of said substructure, providing a support surface for carrying a power tool thereon;
   d. a pair of laterally-extending bracing members attached to said base member;
   e. a plurality of laterally-extending slots located within said bracing members; and
   f. longitudinally-extending guide means, raised above surface of said frame member, said frame member being disposed within slots, and adaptable for lateral movement with respect to said longitudinally-extending base member, said guide means maintaining said power tool in proper alignment for traversing a straight, predetermined, longitudinal path, the distance from the guide means to the longitudinally-extending outer edge of said base member, the predetermined support surface on which said power tool will ride, being such that said power tool will be in close proximity with, and move parallel to, said outer edge, and said frame member being laterally adjustable for providing a laterally-extending support surface capable of carrying a plurality of power tools.

9. The power tool track of claim 8, wherein said power tool track includes means for lockingly maintaining said frame member in position, thereby providing a laterally-extending support surface of predetermined dimension capable of properly carrying a given power tool on said support surface.

10. The power tool track of claim 8, which further includes means for lockingly maintaining said frame member in position, thereby providing a laterally-extending support surface of predetermined dimension capable of properly carrying a given power tool on said support surface.

* * * * *